United States Patent
Zhou et al.

(10) Patent No.: US 8,553,350 B2
(45) Date of Patent: Oct. 8, 2013

(54) TRIBOLOGICAL MONITORING OF A DATA STORAGE DEVICE

(75) Inventors: Lin Zhou, Eagan, MN (US); Huazhou Lou, Eden Prairie, MN (US); Dongming Liu, Eden Prairie, MN (US); Vincent Bernard Engelkes, Maple Grove, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 318 days.

(21) Appl. No.: 13/117,969

(22) Filed: May 27, 2011

(65) Prior Publication Data
US 2012/0300335 A1 Nov. 29, 2012

(51) Int. Cl.
*G11B 21/02* (2006.01)
(52) U.S. Cl.
USPC .............................................. 360/75
(58) Field of Classification Search
None
See application file for complete search history.

(56) References Cited

U.S. PATENT DOCUMENTS

| | | | |
|---|---|---|---|
| 5,539,592 A | 7/1996 | Banks et al. | |
| 5,859,357 A | 1/1999 | Kameyama et al. | |
| 5,859,358 A | 1/1999 | Wood et al. | |
| 6,857,975 B2 | 2/2005 | Kitamura | |
| 6,880,386 B1 | 4/2005 | Krotil et al. | |
| 7,171,845 B2 | 2/2007 | Mate et al. | |
| 7,810,382 B2 | 10/2010 | Schimmel et al. | |
| 2011/0299190 A1* | 12/2011 | Lee et al. | 360/75 |
| 2012/0120522 A1* | 5/2012 | Johnson et al. | 360/75 |

FOREIGN PATENT DOCUMENTS

EP 0404265 A1 12/1990

* cited by examiner

*Primary Examiner* — Andrew L Sniezek
(74) *Attorney, Agent, or Firm* — Hall Estill Attorneys at Law

(57) ABSTRACT

A system that is capable of monitoring tribological data, such as friction, in a data storage device. In accordance with various embodiments, a magnetoresistive head is separated from a rotating data storage media by an air bearing and attached to a slider that is adjusted through deformation controlled by a heating element. A measurement circuit concurrently monitors friction from the head and power applied to the heating element to determine an MR head clearance. The measurement circuit includes at least a phase filter that eliminates off-phase friction from contributing to the determination of the MR head clearance.

20 Claims, 4 Drawing Sheets

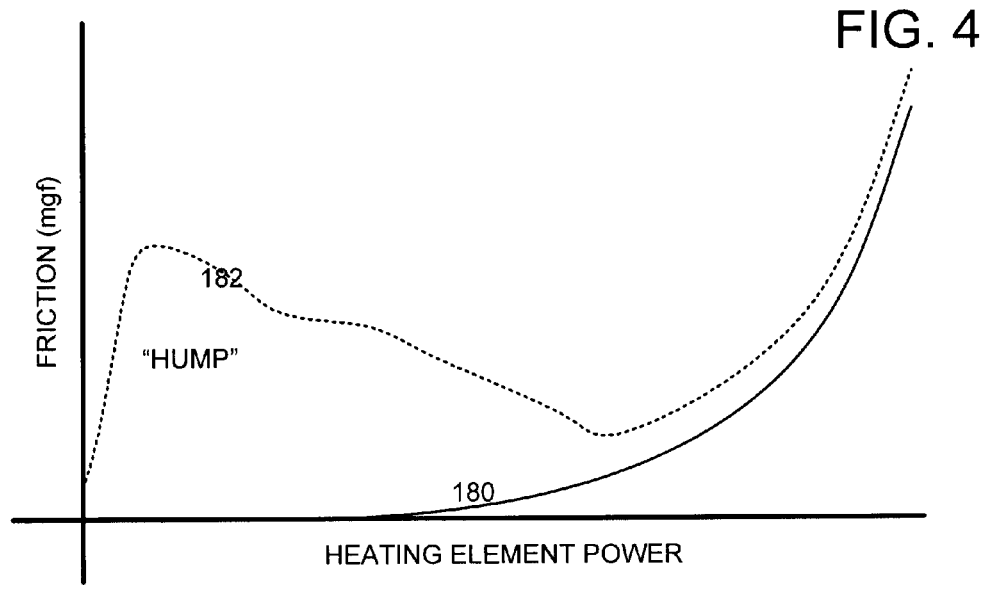
FIG. 4
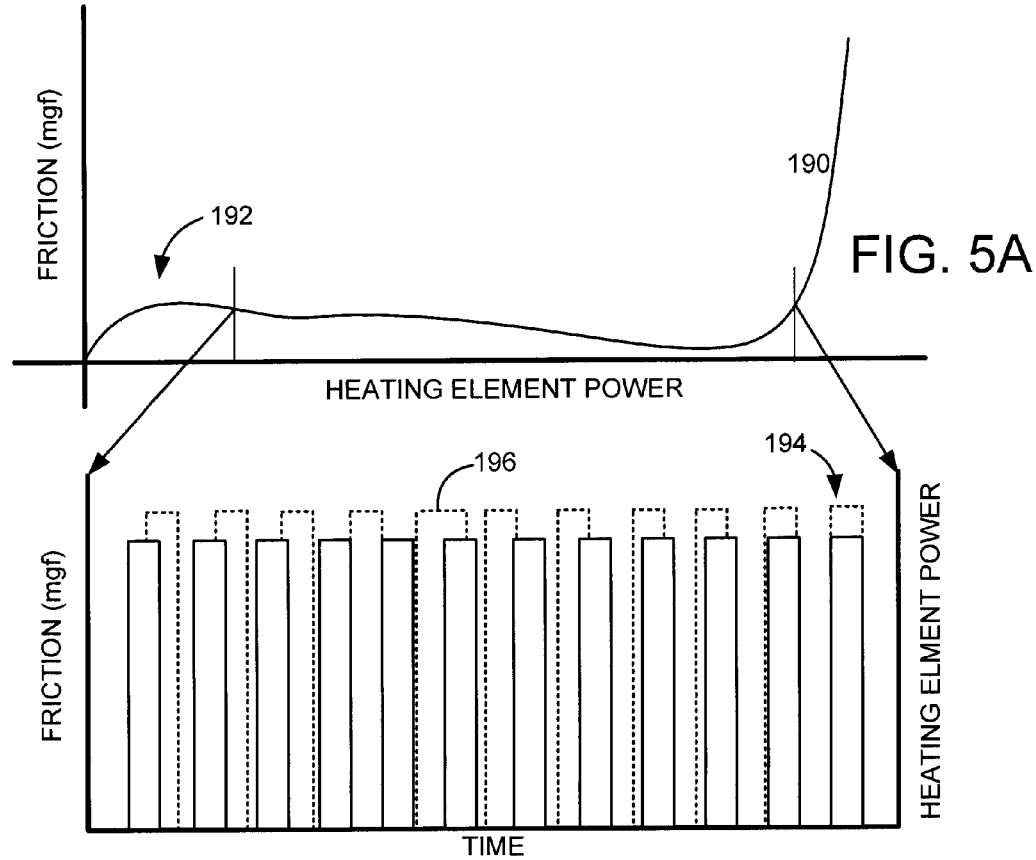
FIG. 5A
FIG. 5B

TRIBOLOGICAL MONITORING OF A DATA STORAGE DEVICE

SUMMARY

Various embodiments of the present invention are generally directed to a system that is capable of monitoring tribological data, such as friction, in a data storage device.

In accordance with various embodiments, a magnetoresistive head is separated from a rotating data storage media by an air bearing and attached to a slider that is adjusted through deformation controlled by a heating element. A measurement circuit concurrently monitors friction from the head and power applied to the heating element to determine an MR head clearance. The measurement circuit includes at least a phase filter that eliminates off-phase friction from contributing to the determination of the MR head clearance.

These and other features and advantages which characterize the various embodiments of the present invention can be understood in view of the following detailed discussion and the accompanying drawings.

BRIEF DESCRIPTION OF THE DRAWINGS

FIG. 4 plots exemplary tribological data obtained during the operation of a data storage device.

FIG. 5A-5B provides various graphs of exemplary tribological data as received and computed by a measurement circuit in accordance with various embodiments.

DETAILED DESCRIPTION

The present disclosure generally relates to a tribological data system that uses a measurement circuit to obtain and accurately predict the position of a magnetoresistive (MR) head in relation to a corresponding rotatable data media. An increasing demand for higher data capacity has placed added emphasis on the amount of data written to a data storage media, which consequently results in a reduction in the size of data bits and component tolerances. One such reduced component tolerance is the air bearing that separates a rotating data media from the MR head. During routine operation, the air bearing can suddenly and dramatically change so that the head contacts the data media with traumatic results. Routine operation is further complicated by the use of a heating element that adjusts the head clearance from the data media.

Accordingly, various embodiments of the present invention are generally directed to a measurement circuit that continuously monitors power applied to a heating element and friction between the head and rotatable data media to determine an MR head clearance using heating element induced contact as an indication that the head has touched the data media. The concurrent monitoring of the heating element and friction with at least a phase filter that eliminates unwanted off-phase friction measurements allows for quick and precise prediction of prior and future heating element induced contact between the head and data media due to the air bearing size crossing critical threshold values.

Figure 1:
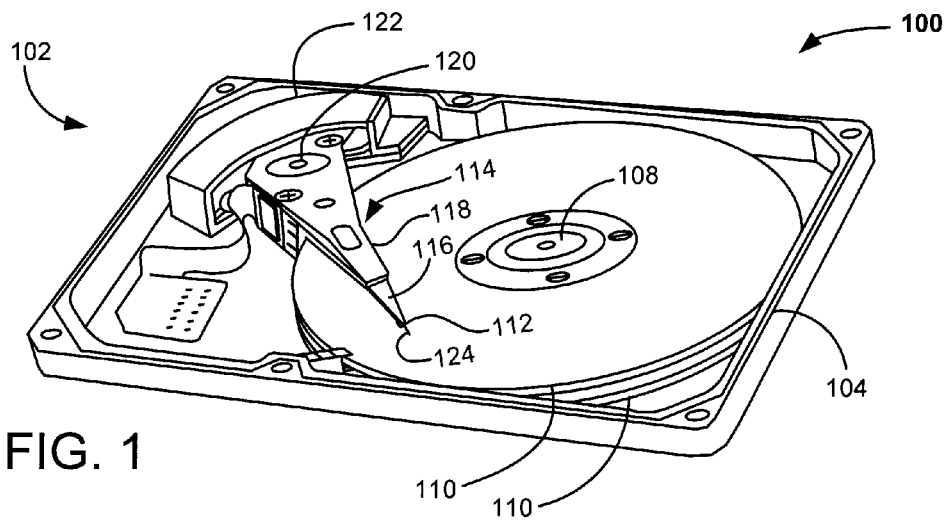
FIG. 1 generally provides of an exemplary data storage device.

While a measurement circuit can be used in a variety of non-limiting applications, FIG. 1 provides an exemplary data storage device 100 that is capable of utilizing the measurement circuit to monitor friction, heating element power, and heating element induced contact to predict current and future MR head clearance and air bearing sizes. The device 100 is provided to show an exemplary environment in which various embodiments of the present invention can be advantageously practiced. It will be understood, however, that the claimed subject matter is not so limited.

The device 100 includes a substantially sealed housing 102 formed from a base deck 104 and top cover 106. An internally disposed spindle motor 108 is configured to rotate a number of storage media 110. The media 110 are accessed by a corresponding array of data transducers that are each supported by a head gimbal assembly (HGA) 112. Each HGA 112 can be supported by a head-stack assembly 114 ("actuator") that includes a flexible suspension 116, which in turn is supported by a rigid actuator arm 118. The actuator 114 preferably pivots about a cartridge bearing assembly 120 through application of current to a voice coil motor (VCM) 122.

In this way, controlled operation of the VCM 122 causes the transducers 124 of the HGA 112 to align with tracks (not shown) defined on the media surfaces to store data thereto or retrieve data therefrom. An ability to decrease the width of the tracks while maintaining proper alignment of the transducers 124 can be accomplished by decreasing the operational width of at least one transducing magnetic element. Thus, the device 100 can have increased capacity through the incorporation of transducing elements with reduced operational width which corresponds to a finer areal resolution.

Figure 2:
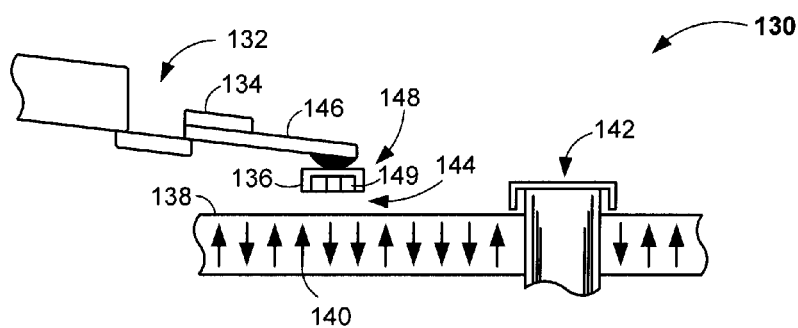
FIG. 2 is a perspective view of an exemplary portion of a data storage device.

An exemplary data transducing portion 130 of the data storage device 100 of FIG. 1 is displayed in FIG. 2. The transducing portion 130 has an actuating assembly 132 with a heating element 134 that positions a transducing head 136 a predetermined distance over a magnetic storage media 138 to allow the storing of data bits 140. The storage media 138 is attached to a spindle motor 142 that rotates during use and operates in conjunction with the heating element 134 to produce an air bearing 144 on which a slider portion 146 of the actuating assembly 132 flies to position a head gimbal assembly (HGA) 148, which includes the transducing head 136, over a desired portion of the media 138 at a predetermined height.

The transducing head 136 can include one or more transducing elements, such as a magnetic writer and magnetically responsive reader, which operate to program and read data from the storage media 138, respectively. As a result, controlled motion of the actuating assembly 132 causes the transducers to align with tracks (not shown) defined on the storage media surfaces to write, read, and rewrite data. The transducing head 136 can further include at least one probe 149, such as a high sensitivity capacitance probe and force gage, which senses actuating assembly 132 performance characteristics, such as friction, speed, and slider deformation. In operation, the reduction in data bit size that corresponds with smaller actuating assembly 132 form factor and friction measurements can induce data access inaccuracies as the air bearing inadvertently becomes too big or small.

In view of the susceptibility of air bearing volatility, the actuating assembly 132 can be constantly monitored for both head friction and heating element 134 power to determine if the air bearing is currently or has previously passed an operational size threshold. A precise determination that the air bearing is outside of desired operating parameters can allow for enhanced accuracy through adjustment of the heating element 134 and subsequent re-access to data bits that were passed while the air bearing was out of the desired operating size. The monitoring of performance data and continuous determination of the size of the air bearing can be done in a variety of manners, one of which is the use of a measurement circuit, as generally illustrated in FIG. 3.

Figure 3:
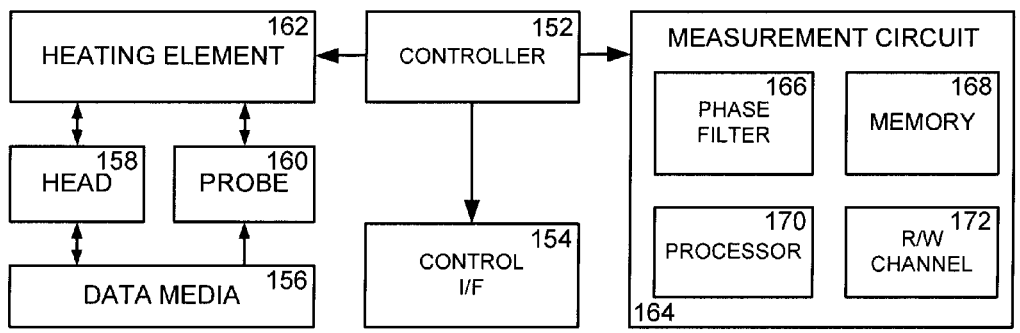
FIG. 3 shows a block representation of an exemplary data storage device as constructed and operated in accordance with various embodiments of the present invention.

In FIG. 3, a functional block representation of a portion of an exemplary data storage device 150 is displayed as constructed and operated in accordance with various embodiments of the present invention. Top level control of the device 150 is carried out by a suitable controller 152, which may be a programmable or hardware based microcontroller. The controller 152 communicates with a host device via a controller interface (I/F) circuit 154 and provides access to and from data on a corresponding data storage media, such as media 156. The controller 152 can further manage the physical positioning of a transducing head 158 and testing probe 160, either simultaneously or independently, by adjusting the amount of power received by the heating element 162 and the rotational speed of the data media 156, such as through control of a VCM as described above.

The controller 152 and controller interface 154 can provide a measurement circuit 164 with performance data from the head 158, testing probe 160, and heating element 162 that allows for calculation of the air bearing between the head 158 and the data media 156. While the measurement circuit 164 can include any number of components or utilize external components, such as a central processing unit (CPU) and random access memory (RAM), the measurement circuit 164 allows for the continuous monitoring of performance data that includes at least friction between the head 158 and media 156 as well as the power applied to the heating element 162.

Such continuous monitoring of performance data proceeds to pass through a phase filter 166 to ensure that the friction and heating element power measurements are in-phase. The monitored performance data can be initially or subsequently stored in local memory 168 after passing through the phase filter 166 to be used as a reference for predicting future MR head clearance.

The measurement circuit 166 can locally interpret the performance data with a processing circuit 170 to determine the size of the air bearing and position of the head 158 relative to the data media 156. In some embodiments, both performance and programmed data, such as data bits 140 of FIG. 2, are simultaneously processed by the measurement circuit 164 as performance data is computed by the processing circuit 170 and programmed logical state data from the media 156 is translated into programmed binary code by the read/write (R/W) channel 172.

The ability to interpret and control both physical performance and programmed data from the head 158 with the measurement circuit 164 provides enhanced data accuracy as the size of the air bearing is continuously related to the programmed data received by the R/W channel 172. However, it should be noted that such advantageous use of the measurement circuit 164 can be utilized with the processing circuit 170, local memory 168, and R/W channel 172 being positioned elsewhere in the device 150 and controlled by various other components of the device 150.

As the data storage device 150 operates, the head 158, heating element 162, and testing probe 160 will produce performance data that can be graphed and interpreted by the measurement circuit 164. A graph of exemplary performance data is provided in FIG. 4, which illustrates an optimized tribological curve, as represented by solid line 180, and an undesired tribological curve, as represented by segmented line 182. As shown, the optimized curve 180 is smooth as measured friction predictably increases as heater power is applied to deform the slider, such as slider 146 of FIG. 2, and reduce the air bearing size to the point of head contact with the data media. The shape and continuity of the optimized curve 180 allows the measurement circuit to very precisely determine where the transducing head is in relation to the data media.

In contrast to the optimized curve, the undesired curve 182 has large volatile movements that taint any ability to precisely determine the size of the air bearing. That is, the "hump" corresponding to low heating element power could be interpreted as a past or future contact between the head and data media and result in improper heating element settings and incorrect clearance for read/write operations. In some embodiments, the optimized curve 180 maintains a friction force below a threshold, such as 1 mgf, until the heating element receives enough power to deform the slider and adjust the air bearing. Other embodiments configure the optimized curve 180 so that friction remains below a threshold until the heater deforms to the point of contacting the head with the data media. By setting such threshold values, the size of the air bearing can be precisely monitored and an optimal head position can be maintained that allows for the efficient transfer of high density data from the data media.

FIGS. 5A & 5B graph separate performance data that illustrates both friction and phase measurements to determine the MR head clearance associated with the air bearing size. FIG. 5A provides an undesired tribological curve 190 that includes an increased friction hump 192 corresponding with low heating element power. A portion of the undesired curve 190 is plotted as a bar graph in FIG. 5B with friction (solid boundary) and heating element power (segmented boundary) measurements over time.

A review of the temporal differences shown in FIG. 5B illustrate the unwanted hump 192 of FIG. 5A corresponds with friction and heating element power measurements that are out of phase. That is, the performance data received by a measurement circuit will arrive at different times due to the beginning and ending of the respective friction and power measurements not coinciding. It can be observed that the hump 192 occurs when the performance measurements are out of phase, but disappears and the undesired curve 190 matches the optimal curve of FIG. 4 when the measurements match in both beginning and ending times, as displayed by bar graph section 194.

When the performance data is out of phase, various issues plague the determination of head contact with the data media that cannot be quickly remedied while the data storage device is in operation. Further complicating the determination of the MR head clearance occurs when the friction and power measurements are different durations, as displayed by bar 196. However, when the measurement circuit, such as circuit 164 of FIG. 3, includes a phase filter, off-phase measurements can be eliminated. Such a phase filter can allow any off-phase friction measurements to be allocated to head interactions other than with the disk, such as windage and debris. These off-phase measurements can then be compensated for by the air bearing self-compensation techniques.

The uses of a phase filter to eliminate off-phase tribological performance measurements allow for an improvement over friction determinations using a lock-in method. For example, a lock-in method makes friction measurements relative as merely the difference in friction when the heating element is on versus when it is off. Such relative measurement does not allow for continuous measurement and determination of heating element induced contact as the heating element is powered and deformed, but not yet fully on or off. The lock-in method further fails to allow for phase compensation with a phase filter due to the combination of friction and power measurements resulting in incorrect friction measurements and MR head clearance determinations, which results in unreliable head positioning and a lack of accurate compensation options.

Configuring a measurement circuit with a phase filter further allows for concurrent operation of the head for data access and adjustment of the heating element power to provide an optimal head clearance. With higher density data storage media, the ability to maintain the head at an optimal height, such as a few nanometers, provides numerous operational enhancements that include at least data access reliability and speed. In contrast, the use of the lock-in method requires an evaluation of friction when the heater is fully on and off, which eliminates the ability to continuously determine heating element induced contact and air bearing size. As such, a phase filter provides continuous air bearing monitoring that allows for proactive prediction and correction of the head clearance becoming too big or small while the MR head conducts normal data access operations.

Figure 6:
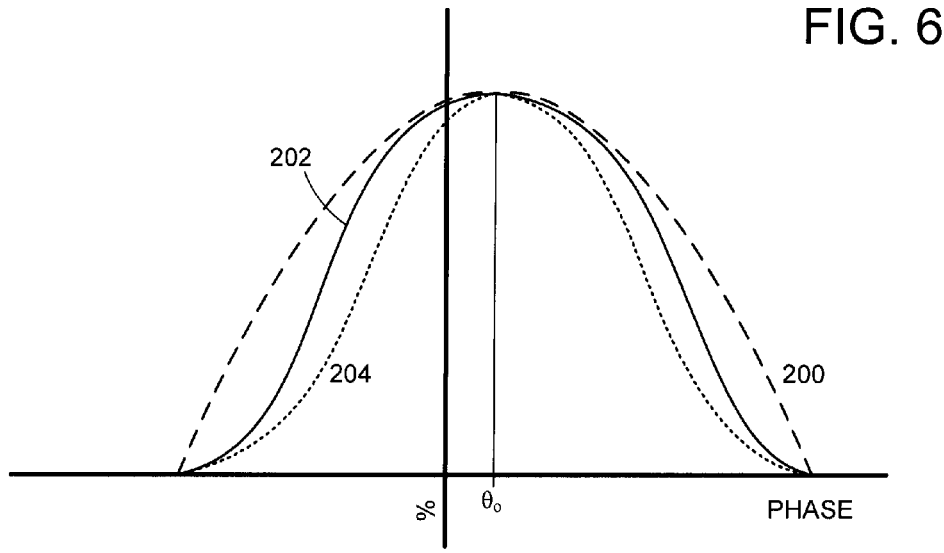
FIG. 6 plots exemplary variations in phase filtering of tribological data.

The operation of the measurement circuit with a phase filter allows the adjustment and optimization of performance data monitoring to provide the most accurate MR head clearance determinations by conducting multiple order phase filtering. FIG. 6 displays exemplary phase filter operations in a variety of different orders. A first order filter operation, as shown by segmented line 200, illustrates how phase is gradually narrowed to a particular zero or non-zero degree, in this case $\theta_o$ which corresponds to system delay that can include at least flexure beam delay, heating element time constant, and cabling delay. When the first order data is again passed through the phase filter, a more abrupt phase curve 202 illustrates the improvement in combining both performance measurements into a more homogeneous phase. In yet another pass through the phase filter, as shown by curve 204, the phase more quickly approaches the particular degree as an indication that the performance measurements are more in phase.

The use of such multiple order phase filtering can allow a measurement circuit to be configured with desired accuracy at the cost of head clearance determination speed. That is, a measurement circuit can be configured to have a high level of accuracy, multiple order filtering, but may experience a slowing of the calculation of the air bearing size and MR head clearance. In this way, the degree to which future head contact with the data media can be predicted can be modified by adjusting the accuracy of the in-phase performance friction and power measurements.

Figure 7A:
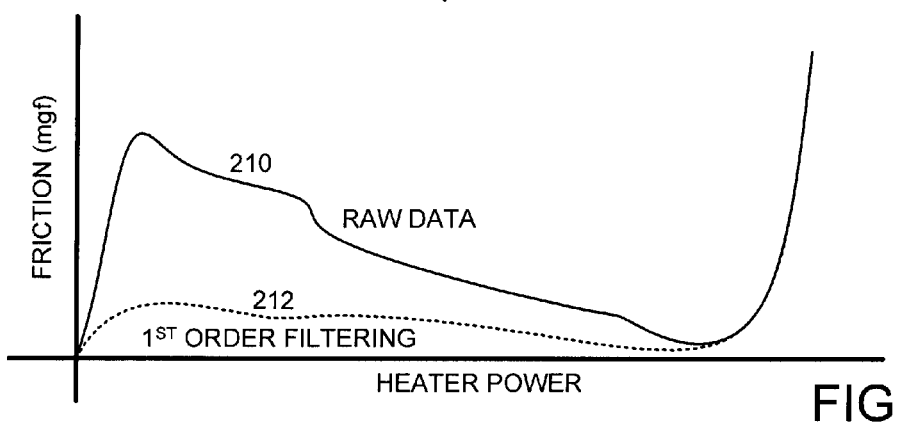
FIGS. 7A-7B graph exemplary performance data with various measurement circuit configurations.
Figure 7B:
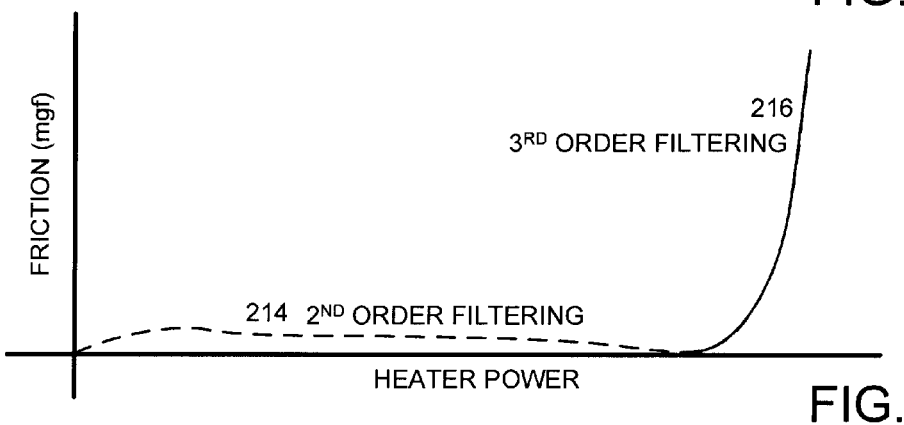

FIGS. 7A and 7B graph the use of multiple order phase filtering in reducing the premature hump in a tribological curve. In FIG. 7A, a series of exemplary off-phase performance measurements correlate with the drastic hump shown in the first tribological curve 210. As can be appreciated, the hump of curve 210 can hamper the operation of a close tolerance data storage device by minimizing the time the head spends at its optimal height as a result of unnecessary heating element adjustments. Such adjustments can cause the head to inaccurately access data and degrade the data media through repeated head contact occurrences.

As discussed above, the use of first order phase filtering can reduce the hump in the tribological curve and make the determination of the position of the head much more accurate. However, first order filtering, as displayed by curve 212 of FIG. 7A, may not provide enough accuracy to maintain tight head tolerances. Accordingly, multiple additional filter passes can further minimize the hump as off-phase measurements are eliminated and compensated as in-phase measurements are utilized in calculating the head clearance corresponding to the air bearing size. FIG. 7B plots the further improved accuracy of the tribological curves 214 and 216 after a successive number of phase filter passes. As a result, a nearly unrecognizable hump is present as curve 216 closely follows the optimal tribological curve shown in FIG. 4.

Figure 8:
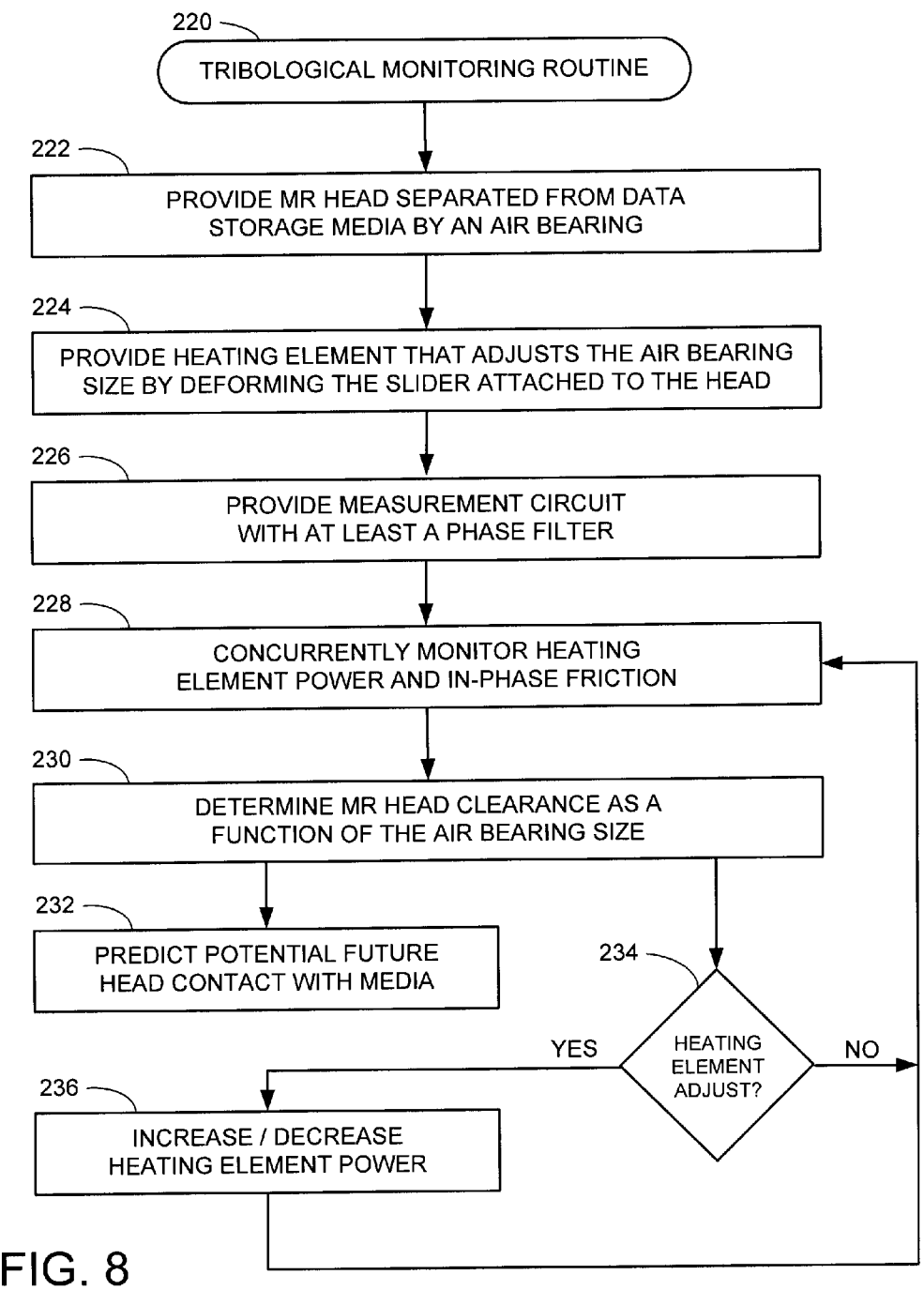
FIG. 8 provides a flowchart mapping an exemplary tribological monitoring routine conducted in accordance with various embodiments of the present invention.

FIG. 8 provides an exemplary tribological monitoring routine 220 conducted in accordance with various embodiments of the present invention. The routine 220 begins by providing an MR head separated from a data storage media by an air bearing in step 222. The head may be constructed with a testing probe that can provide measured performance data, such as friction and strain, to a measurement circuit. The head is connected to a slider that allows for flight of the MR head over the data storage media on the air bearing. The slider is selectively adjusted with a heating element that is provided in step 224 and heats with applied power to deform the slider and modify the head clearance.

Step 226 provides a measurement circuit that concurrently monitors performance measurements from the testing probe and the heating element while data access operations are being conducted. That is, the measurement circuit monitors the normal operation of the MR head that can include data programming and reading to determine the position of the MR head without having to delay scheduled data accesses or place the data storage device in an exclusive testing mode. This normal operation is monitored in step 228 while passing the performance measurements through a phase filter to ensure friction and heating element power are in-phase for maximum accuracy.

The filtered performance data is then calculated in step 230 to determine the MR head clearance as function of the air bearing size. In the event a threshold friction measurement is crossed, the measurement circuit can adjust the heating element power to precisely position the MR head at a predetermined optimal height above the data storage media. The measurement circuit can further use the filtered performance data to proactively predict MR head clearance using various diagnostic tools in step 232, such as but not limited to trend analysis, standard deviation, and moving averages. Such prediction of future MR head clearance can be done independently or in conjunction with determining the present air bearing size and MR head clearance in step 230.

With the MR head clearance determined in step 230, the routine 220 evaluates whether or not to adjust the heating element in decision 234. Adjustment of the heating element can be done for routine testing, evaluation, and optimization of the MR head height in events where undue stress, such as overheating and physical shock, have potentially moved the MR head or slider inadvertently. A decision to adjust the heating element advances the routine 220 to step 236 where power is either increased or decreased depending on the current size of the air bearing and the desired MR head position.

If no heating element adjustment is desired from decision 234 or after the conclusion of a heating element adjustment in step 236, the routine 220 returns to the concurrent monitoring of performance measurements in step 228. Through the routine 220, the size of the air bearing is determined and predicted with enhanced accuracy due to phase filtering. However, the routine 220 is not required or limited as the various decisions and steps can be omitted, changed, and added. For example, prediction of future MR head clearance in step 232 can be omitted while multi-order phase filtering is included.

It can be appreciated that the configuration and operational characteristics of the measurement circuit described in the present disclosure allows for advantageous MR head operation in high data bit density application through the increased measurement accuracy supplied by phase filtering. Such enhanced MR head operation improves data reliability and speed as the air bearing is maintained at an optimal size. Moreover, the concurrent measurement of friction to determine MR head clearance allows for use while the MR head conducts normal data access functions and proactive prediction of future MR head clearance adjustments that maintain the MR head at the optimal height above a corresponding data media. In addition, while the embodiments have been directed to magnetic sensing, it will be appreciated that the claimed subject matter can readily be utilized in any number of other applications, including data storage device applications.

It is to be understood that even though numerous characteristics and advantages of various embodiments of the present invention have been set forth in the foregoing description, together with details of the structure and function of various embodiments, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
   a magnetoresistive (MR) head separated from a rotating data storage media by an air bearing and attached to a slider;
   a heating element capable of adjusting the air bearing by deforming the slider; and
   a measurement circuit that concurrently monitors friction from the MR head and power applied to the heating element to determine an MR head clearance, the measurement circuit including at least a phase filter that eliminates off-phase friction from contributing to the determination of the MR head clearance.

2. The apparatus of claim 1, wherein a testing probe is attached to the MR head and detects friction between the MR head and rotating data storage media.

3. The apparatus of claim 2, wherein the testing probe is a high sensitivity capacitance probe.

4. The apparatus of claim 1, wherein the measurement circuit has a read/write channel to allow data accesses from the rotatable data storage media by the MR head.

5. The apparatus of claim 1, wherein the friction from the MR head and power applied to the heating element are in different phases.

6. The apparatus of claim 1, wherein the phase filter is capable of multiple order filtering.

7. The apparatus of claim 1, wherein the phase filter reduces the friction from the MR head and the power applied to the heating element to a non-zero degree.

8. The apparatus of claim 1, wherein the heating element is adjusted in response to a physical shock.

9. The apparatus of claim 1, wherein the heating element is adjusted in response to an overheating event.

10. A method comprising:
    providing a magnetoresistive (MR) head separated from a rotating data storage media by an air bearing and attached to a slider;
    adjusting the air bearing with a heating element that deforms the slider; and
    monitoring friction from the MR head concurrently with power applied to the heating element with a measurement circuit to determine the size of the air bearing, the measurement circuit including at least a phase filter that eliminates off-phase friction from contributing to the determination of the air bearing size.

11. The method of claim 10, wherein the monitoring step is conducted in conjunction with the MR head accessing data from the rotating data storage media.

12. The method of claim 10, wherein the friction from the MR head and the power applied to the heating element are out of phase.

13. The method of claim 12, wherein the out of phase friction and power correspond to an inflated friction value.

14. The method of claim 13, wherein the inflated friction value surpasses an air bearing size threshold and triggers modification of the power applied to the heating element.

15. The method of claim 10, wherein the friction from the MR head and power applied to the heating element are passed through the phase filter to arrive at a predetermined phase degree.

16. The method of claim 15, wherein the friction and power are passed through the phase filter multiple successive times, each pass enhancing the accuracy of the friction and air bearing size.

17. The method of claim 10, wherein the air bearing is adjusted and maintained in a predetermined optimal size.

18. A method of providing a magnetoresistive (MR) head separated from a rotating data storage media by an air bearing and attached to a slider, adjusting the air bearing with a heating element that deforms the slider, monitoring friction from the MR head concurrently with power applied to the heating element with a measurement circuit to determine an MR head clearance, the measurement circuit including at least a phase filter that eliminates off-phase friction from contributing to the determination of the MR head clearance, and predicting future MR head contact with the rotating data media.

19. The method of claim 18, wherein analysis of a tribological curve indicates MR head contact with the rotating media is likely.

20. The method of claim 18, wherein the friction from the MR head and power applied to the heating element are passed through the phase filter multiple times to increase the accuracy of the predicting step.

* * * * *